United States Patent
Akiyama

(10) Patent No.: US 6,796,662 B2
(45) Date of Patent: Sep. 28, 2004

(54) ILLUMINATION OPTICAL SYSTEM AND PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/373,763

(22) Filed: Feb. 27, 2003

(65) Prior Publication Data

US 2003/0214634 A1 Nov. 20, 2003

Related U.S. Application Data

(63) Continuation-in-part of application No. PCT/JP02/04183, filed on Apr. 25, 2002.

(30) Foreign Application Priority Data

Apr. 27, 2001  (JP) ........................................ 2001-132768

(51) Int. Cl.[7] ........................... G03B 21/14; G03B 21/20
(52) U.S. Cl. .......................................... 353/102; 353/38
(58) Field of Search ............................... 353/34, 38, 82, 353/98, 101, 102; 362/305, 308, 319, 512

(56) References Cited

U.S. PATENT DOCUMENTS 5,068,768 A * 11/1991 Kobayashi .................. 362/512
6,024,452 A * 2/2000 Vanderwerf et al. .......... 353/38
6,464,362 B1 * 10/2002 Sugawara et al. .......... 353/102

FOREIGN PATENT DOCUMENTS

| EP | 0 997 768 A2 | 5/2000 |
|---|---|---|
| EP | 1 035 734 A2 | 9/2000 |
| JP | A 10-115870 | 5/1998 |
| JP | A 10-171019 | 6/1998 |
| JP | A 10-171020 | 6/1998 |
| JP | A 11-125795 | 5/1999 |
| JP | A 2000-347293 | 12/2000 |
| JP | A 2001-272722 | 10/2001 |

* cited by examiner

Primary Examiner—Christopher Mahoney
(74) Attorney, Agent, or Firm—Oliff & Berridge, PLC

(57) ABSTRACT

The invention provides an illumination optical system and a projector that can efficiently utilize light from a light source by causing light from the light source reflected by an elliptic reflector to pass through the corresponding cell lenses of first and second lens arrays. The illumination optical system causes at least light beams in a center portion around a light-source optical axis, of reflected light reflected by an elliptic reflector, to pass on the optical paths extending slightly outward relative to the optical path parallel to the light-source optical axis, like the light beams, so that the light beams pass through the corresponding cell lenses of a first lens array and a second lens array.

12 Claims, 8 Drawing Sheets

ILLUMINATION OPTICAL SYSTEM AND PROJECTOR

BACKGROUND OF THE INVENTION

1. Field of Invention

The present invention relates to an illumination optical system and a projector.

2. Description of Related Art

In related art projectors, illumination light emitted from an illumination optical system is modulated by a modulation device, such as a liquid crystal panel, according to image information, and the modulated illumination light is projected onto a screen, thereby performing image display.

In order to achieve a uniform in-plane illumination distribution of illumination light to illuminate the modulation device, such a related art projector adopts an integrator illumination optical system in which light emitted from a light source is divided into a plurality of sub-beams, and the sub-beams are superimposed near the modulation device.

FIG. 7 is a schematic of a related art integrator illumination optical system.

The illumination optical system 1000 shown in FIG. 7 includes a light source device 1010 including a light source 1020, an elliptic reflector 1030, and an aspherical lens 1040. FIG. 7 also shows a first lens array 1050, a second lens array 1060, a superimposing lens 1070, and an illumination area LA, such as a liquid crystal panel. The optical components are arranged relative to a light-source optical axis 1020ax (center axis of light flux emitted from the light source device 1010). That is, the first lens array 1050, the second lens array 1060, and the superimposing lens 1070 are arranged substantially perpendicular to the light-source optical axis 1020ax so that the centers thereof are almost aligned with the light-source optical axis 1020ax.

In the integrator illumination optical system 1000, the light source 1020 has a light-emitting portion (arc) having a certain length along the light-source optical axis 1020ax, and is placed so that the center of the arc is disposed near a focal point (first focal point) F1 closer to the elliptic reflector 1030 of two focal points of the elliptic reflector 1030 on the light-source optical axis 1020ax (the center axis of light flux emitted from the light source device 1010). Light emitted from the light-emitting portion is reflected by a reflecting surface 1030R of the elliptic reflector 1030, and the reflected light is changed into light substantially parallel to the light-source optical axis 1020ax by the aspherical lens 1040 while traveling toward a second focal point F2, and enters the first lens array 1050.

As shown in FIG. 7, the first lens array 1050 includes a plurality of cell lenses 1051 having a rectangular outline substantially similar to the shape of the illumination area LA and arranged in a matrix, and divides substantially parallel light from the light source device 1010 into a plurality of sub-beams by the plurality of cell lenses 1051. The second lens array 1060 also includes a plurality of cell lenses 1061 having a rectangular outline and arranged in a matrix, in a manner similar to that in the first lens array 1050, the cell lenses 1061 are provided corresponding to the cell lenses 1051 of the first lens array 1050, and the plurality of sub-beams emitted from the cell lenses 1051 of the first lens array 1050 are collected on the corresponding cell lenses 1061. The plurality of sub-beams emitted from the cell lenses 1061 of the second lens array 1060 are superimposed by the superimposing lens 1070 so as to illuminate the illumination area LA, such as a liquid crystal panel.

In this type of illumination optical system, when the parallelism of the light emitted from the light source 1020 is insufficient, the light cannot pass through the corresponding cell lenses 1051 and 1061 of the first lens array 1050 and the second lens array 1060. Accordingly, the related art includes a technique of increasing the parallelism of light emitted from the light source device 1010, which is disclosed in Japanese Unexamined Patent Application Publication No. 2000-347293, and which was invented by the present inventor.

On the other hand, some integrator illumination optical systems of such a type adopt a parabolic reflector that can simultaneously reflect and collimate light from the light source, without collimating light from the light source by the above-described combination of the elliptic reflector and the aspherical lens. However, in an illumination optical system using a parabolic reflector, as shown in FIG. 9, a reflecting surface 1080R formed of a paraboloid of revolution of a parabolic reflector 1080 has an entrance angle θ (angle around a light-source optical axis 1020ax), which allows light beams radially emitted from a light source 1020 to be guided to an aspherical lens 1040, smaller than the entrance angle of the reflecting surface 1030R formed of an ellipsoid of revolution of the elliptic reflector 1030 (FIG. 9 shows a state in which light guiding to the aspherical lens 1040 is impossible because the entrance angle θ is smaller than that of the reflecting surface 1030R). Therefore, the light utilization efficiency in the parabolic reflector is lower than that in the elliptic reflector 1030. Accordingly, the related art includes integrator illumination optical systems adopting elliptic reflectors.

In an illumination optical system using an elliptic reflector, however, the light intensity distribution is not uniform and tends to be biased toward the light-source optical axis, which causes the following problems. FIG. 10 shows a state in which the light intensity distribution is biased.

FIG. 10 illustrates the loci of light beams radially emitted from the center of a light source of a light source device using a related art elliptic reflector, and shows the illuminance distribution in which the illuminance is high in a center portion near a light-source optical axis 1020ax and decreases away from the optical axis. For this reason, in the related art illumination optical system 1000 shown in FIG. 7 adopting the elliptic reflector, although arc images 1062 formed on the second lens array 1060 should be contained in the cell lenses 1061, as shown in FIG. 11(a), they are offset in the center portion near the light-source optical axis 1020a, and extend into the cells on the peripheries of the cell lenses 1061 in which they should be contained, as shown in FIG. 11(b).

Light beams that are not contained in the cell lenses 1061 of the second lens array 1060, and extend therefrom cannot illuminate the illumination area and are useless, and this results in light loss. The light beams thus extending correspond to light beams that cannot pass through the corresponding lenses 1051 and 1061 of the first lens array 1050 and the second lens array 1060. Although the light beams emitted from the aspherical lens 1040 should be caused to pass through the corresponding cell lenses 1051 and 1061 of the first and second lens arrays 1050 and 1060 by increasing the parallelism of the light beams in the above-described related art illumination optical system, in actuality, some of the light beams in the center portion near the light-source optical axis 1020ax still cannot pass therethrough, and a solution to this problem is desirable.

SUMMARY OF THE INVENTION

The present invention addresses or solves the above and/or other problems, and provides an illumination optical system and a projector that can efficiently utilize light from a light source by directing at least light beams in a center portion around a light-source optical axis, of light beams emitted from an aspherical lens, slightly outward rather than parallel to the light-source optical axis so that the light beams can pass through the corresponding lenses of first and second lens arrays.

An illumination optical system according to one exemplary embodiment of the present invention includes a light source; an elliptic reflector to reflect light from the light source; an aspherical lens having a concave aspherical surface to substantially collimate light reflected from the elliptic reflector; and first and second lens arrays each including a plurality of cell lenses to divide substantially collimated light from the aspherical lens into a plurality of sub-beams. The light source, the elliptic reflector, the aspherical lens, and the first and second lens arrays are arranged along a light-source optical axis, such that, of the reflected light reflected by the elliptic reflector, the optical paths of at least light beams in a center portion around the light-source optical axis are changed to optical paths directed slightly outward rather than parallel to the light-source optical axis so that the light beams pass through the corresponding cell lenses of the first and second lens arrays.

In an illumination optical system according to another exemplary embodiment of the present invention, the conic constant that specifies the shape of the aspherical surface of the aspherical lens is set to be larger than a conic constant that specifies the shape of the aspherical surface of the aspherical lens that allows ideal parallel light to be emitted from the aspherical lens.

In an illumination optical system according to a further exemplary embodiment of the present invention, the paraxial curvature radius of the aspherical surface of the aspherical lens is set to be smaller than the paraxial curvature radius of the aspherical lens that allows ideal parallel light to be emitted from the aspherical lens.

In an illumination optical system according to a further exemplary embodiment of the present invention, the aspherical lens is shifted toward the elliptic reflector from the position at which it can emit ideal parallel light.

An illumination optical system according to a still further exemplary embodiment of the present invention uses the elliptic reflector in combination with the aspherical lens, in which elliptic reflector the distance between a first focal point and a second focal point is longer than that in the elliptic reflector that is combined with the aspherical lens so as to satisfy the condition to emit ideal parallel light from the aspherical lens.

According to these exemplary embodiments, light beams can pass through the corresponding cell lenses of the first lens array and the second lens array, and therefore, arc images of the light source formed on the second lens array can be contained within the cell lenses in which they should be contained. This makes it possible to reduce light loss and to efficiently illuminate the illumination area. (While it has been described that the arc images are formed on the second lens array, they may be formed on the second lens array or near the second lens array. This also applies to the following description.)

In an illumination optical system according to a still further exemplary embodiment of the present invention, of the reflected light reflected by the elliptic reflector, the light beams in the center portion around the light-source optical axis have the optical paths passing through four cell lenses around the light-source optical axis of each of the first lens array and the second lens array.

According to this exemplary embodiment, of a plurality of arc images formed on the second lens array, arc images in four cell lenses around the light-source optical axis, in which light loss is large because the arc images extend outside the cell lenses in the related art optical system, can be contained within the cell lenses, and therefore, it is possible to reduce light loss and to efficiently illuminate the illumination area.

A projector according to an exemplary embodiment of the present invention has any of the above-described optical systems for a projector.

According to this exemplary embodiment, a projector in which the illumination area can be efficiently illuminated and the brightness of a projected image can be increased can be achieved by incorporating any of the above-described illumination optical systems therein.

DETAILED DESCRIPTION OF PREFERRED EMBODIMENTS

First Exemplary Embodiment

Figure 1:
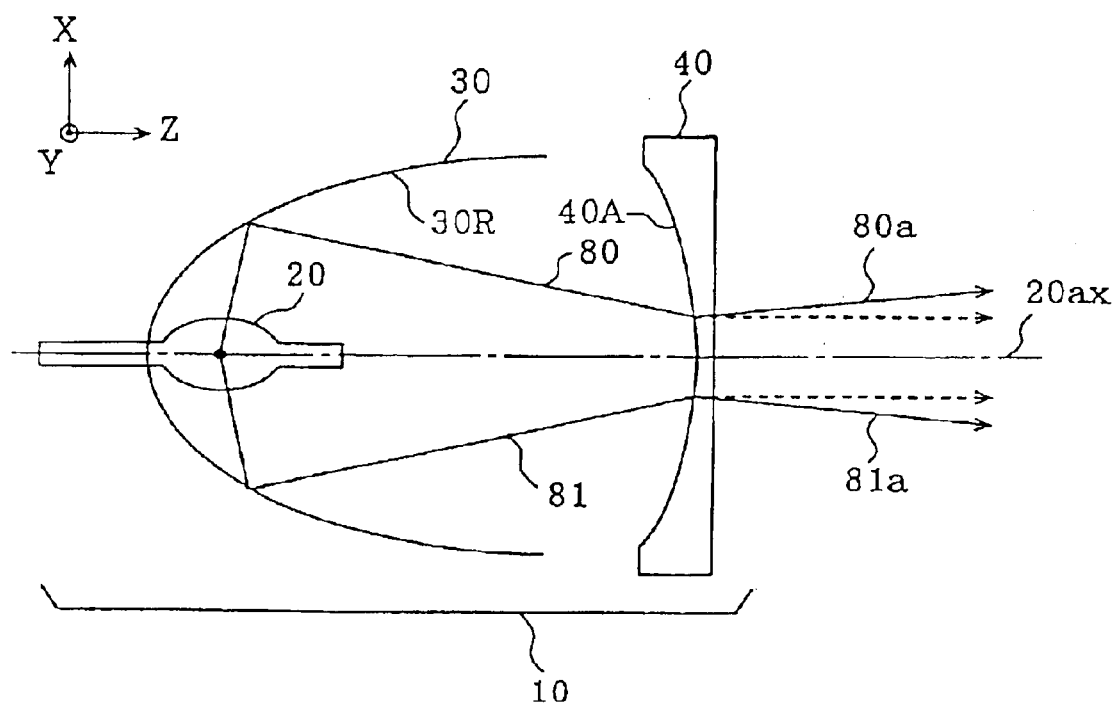
FIG. 1 is a schematic of an illumination optical system according to a first exemplary embodiment of the present invention.
Figure 2:
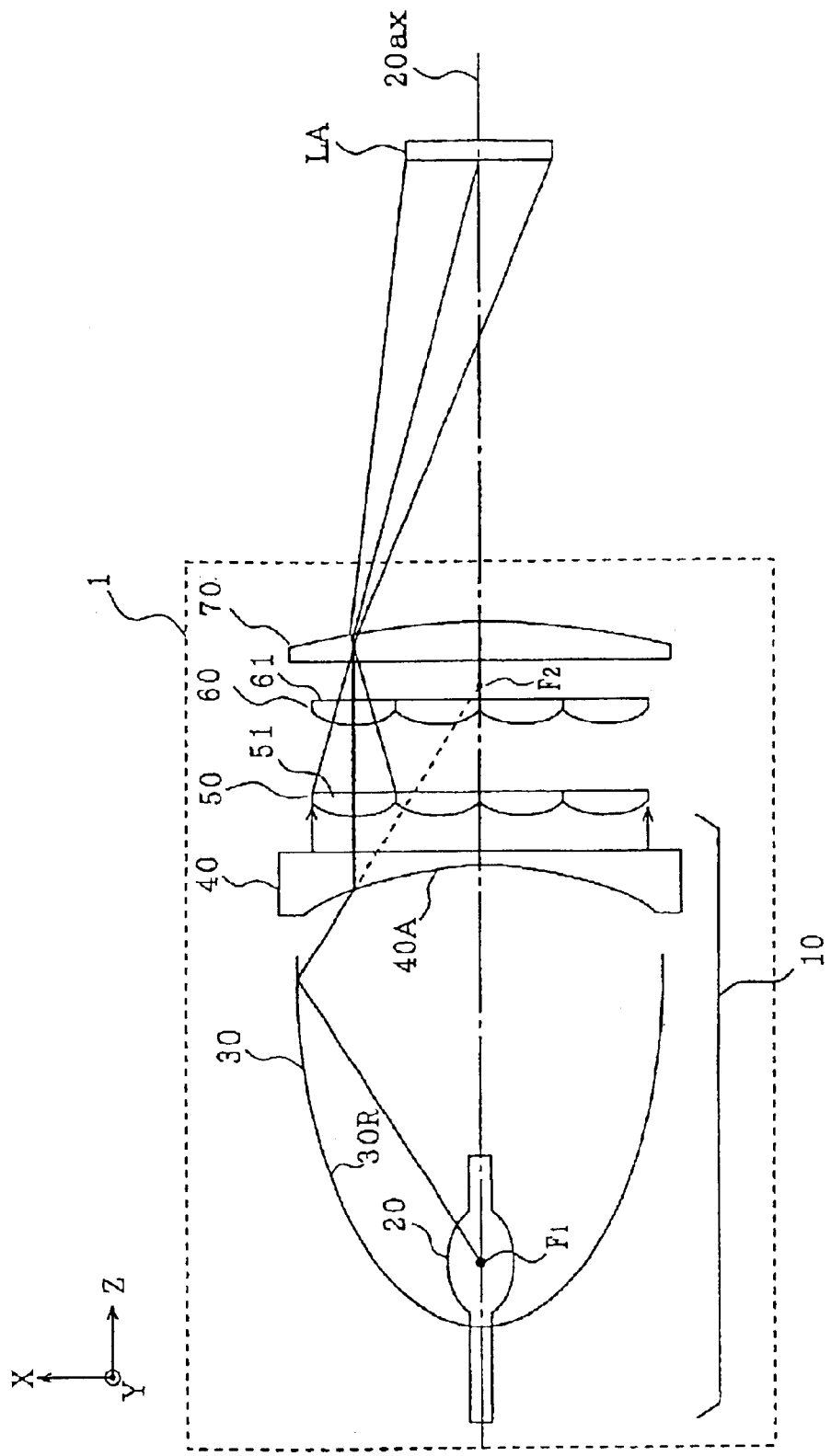
FIG. 2 is a schematic of the illumination optical system according to the first exemplary embodiment of the present invention.

FIG. 1 is a schematic showing a first exemplary embodiment of the present invention, and FIG. 2 is a schematic of an illumination optical system according to the first exemplary embodiment of the present invention.

An illumination optical system 1 shown in FIG. 2 includes a light source device 10, a first lens array 50, a second lens array 60, and a superimposing lens 70. The light source device 10 includes a light source 20 formed of a high-pressure discharge lamp, such as a metal halide lamp or a high-pressure mercury lamp, an elliptic reflector 30, and an aspherical lens 40 in accordance with first exemplary embodiment. The optical elements are arranged relative to a light-source optical axis 20ax (the center axis of light flux emitted from the light source device 10). That is, the first lens array 50, the second lens array 60, and the superimposing lens 70 are arranged substantially perpendicular to the light-source optical axis 20ax so that the centers thereof are almost aligned with the light-source optical axis 20ax.

The light source device 10 includes the light source 20, the elliptic reflector 30, and the aspherical lens 40 in accordance with the first exemplary embodiment. The light source 20 has a light emitting portion(arc) of a certain length along the light-source optical axis 20ax, and is placed so that the center of the arc is positioned near a focal point (first focal point) F1 closer to the elliptic reflector 30 of the two focal points of the elliptic reflector 30 on the light-source optical axis 20ax (the center axis of light flux emitted from the light source device 10).

The elliptic reflector 30 has a reflecting surface 30R of an ellipsoid of revolution formed of a concave surface that is axisymmetric with respect to the light-source optical axis 20ax, and has a function of collecting light from the light source 20 toward a second focal point F2.

The aspherical lens 40 is a lens that changes the optical path of light reflected from the elliptic reflector 30 so that the reflected light from the elliptic reflector 30 passes through the corresponding cell lenses 51 and 61, which is described below, in the first lens array 50 and the second lens array 60. More specifically, the aspherical lens 40 changes the optical paths of light beams passing through a center portion around the light-source optical axis 20ax, of reflected light from the elliptic reflector 30, to the optical paths directed slightly outward rather than the optical paths parallel to the light-source optical axis 20ax, and changes the optical paths of other light beams to the optical paths substantially parallel to the light-source optical axis 20ax. A light incident surface of the aspherical lens 40 is formed of an aspherical surface 40A made of a concave hyperboloid of revolution, and a light exit surface thereof is flat. The first exemplary embodiment provides a certain shape of the aspherical surface 40A, and details thereof are described below.

Figure 8:
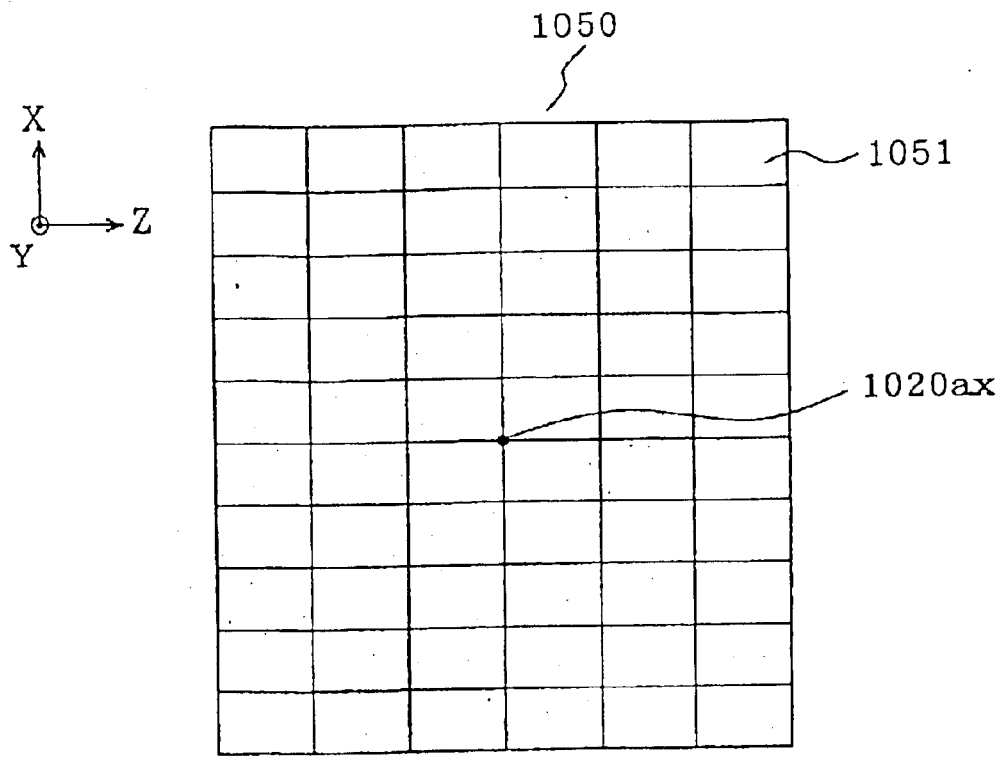
FIG. 8 is a schematic of a lens array.
Figure 9:
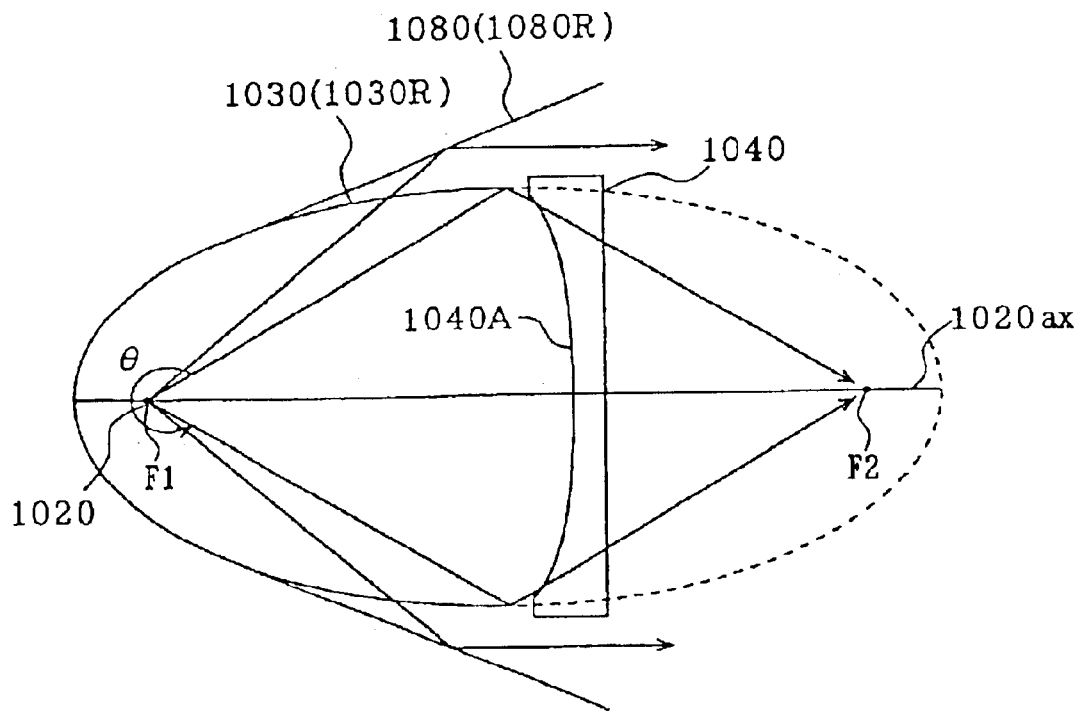
FIG. 9 is a schematic explaining that the angle (entrance angle) around the light-source optical axis which can guide light radially emitted from a light source to an aspherical lens is different between when the reflecting surface of a reflector is an ellipsoid of revolution and when it is a paraboloid of revolution.
Figure 10:
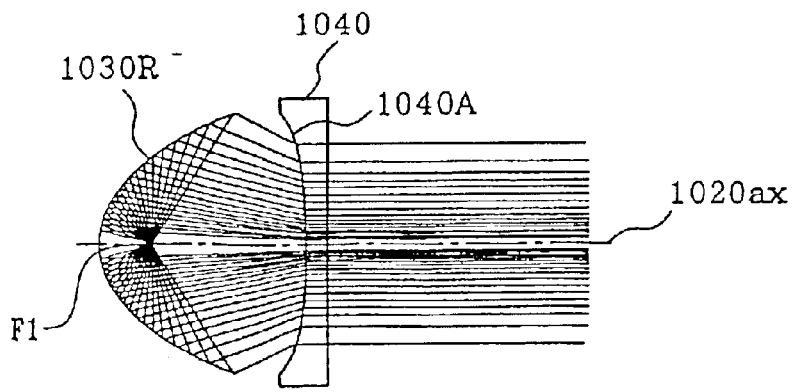
FIG. 10 is a schematic showing the loci of light beams radially emitted from the center of a light source in a light source device using a related art elliptic reflector.

In the first lens array 50, a plurality of cell lenses 51 (see FIG. 2) having a rectangular outline are arranged in a matrix, in a manner similar to that shown in FIG. 8 described above. The outer shape of each cell lens 51 is normally set to be substantially similar to the shape of an illumination area LA, as viewed from the z-direction. The first lens array 50 with such a structure serves to divide emergent light emitted from the light source device 10 into a plurality of sub-beams by a plurality of cell lenses 1051, and to collect the plurality of sub-beams onto the corresponding cell lenses 61 of the second lens array 60. The sub-beams do not always need to be collected on the corresponding cell lenses 61 of the second lens array 60, and they may be collected on the cell lenses 61 or near the cell lenses 61. This also applies to the following description.

In the second lens array 60, a plurality of cell lenses 61 having a rectangular outline, in a manner similar to that in the first lens array 50, are arranged in a matrix. The cell lenses 61 are provided corresponding to the cell lenses 51 of the first lens array 50. Images on the cell lenses 51 of the first lens array 50 pass through the corresponding cell lenses 61, and are thereby focused on the illumination area LA. It is only necessary that the cell lenses 61 of the second lens array correspond to the cell lenses 51 of the first lens array, and the cell lenses 61 do not always need to have the same shape as that of the cell lenses 51.

The superimposing lens 70 serves to superimpose a plurality of sub-beams emitted from the corresponding cell lenses 51 of the first lens array 50 onto the illumination area LA.

Figure 7:
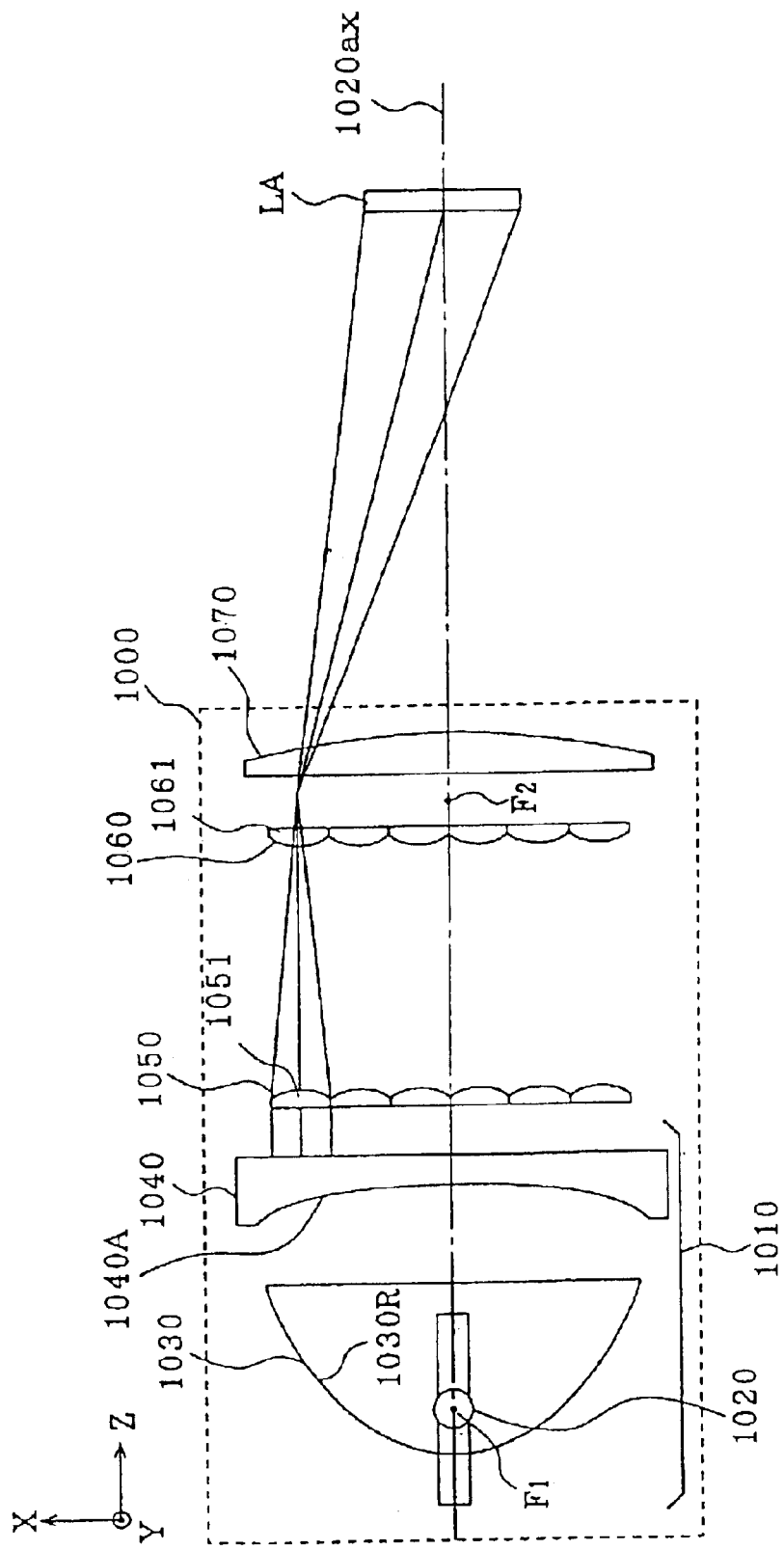
FIG. 7 is a schematic of a related art illumination optical system.

In the related art light source device 1010 shown in FIG. 7, as described above, reflected light from the elliptic reflector 1030 is collimated by the aspherical lens 1040 so that it passes through the corresponding cell lenses 1051 and 1061 of the first lens array 1050 and the second lens array 1060. In actuality, however, the light beams in the center portion around the light-source optical axis 1020ax do not pass therethrough, as described above.

Accordingly, in the following exemplary embodiments including the first exemplary embodiment, of the light reflected by the elliptic reflector 30, light beams passing through the center portion containing the light-source optical axis 20ax are not made parallel to the light-source optical axis 20ax, but are directed slightly outward (away from the light-source optical axis 20ax) so that the light beams pass through corresponding cell lenses 51 and 61 of the first lens array 50 and the second lens array 60, that is, so that arc images will not extend outside the cell lenses 61.

There is a combination of the elliptic reflector 30 and the aspherical lens 40 best suited to make light emitted from the aspherical lens 40 into ideal parallel light (there are a wide variety of combinations in accordance with, for example, the shape of the elliptic reflector 30, the refractive index of the aspherical lens, and the position of the aspherical lens 40). In this specification, light beams passing through the center portion containing the light-source optical axis 20ax are directed outward by adding various changes described in the following exemplary embodiments, including the first exemplary embodiment, with reference to the state of the most suitable combination.

As a method for achieving the combination best suited to obtain ideal parallel light, the present applicant has disclosed in Japanese Unexamined Patent Application Publication No. 2000-347293 that ideal parallel light can be obtained when the shape of the aspherical surface satisfies the following condition:

Equation 1

$$Z - \frac{c \cdot r^2}{1 + \sqrt{1 - (1+K) \cdot c^2 \cdot r^2}} = 0 \qquad (1)$$

Herein, r and Z represent coordinate values in the rθZ cylindrical coordinate system that has the origin at the intersection of the aspherical surface 40A and the light-source optical axis 20ax and that is axisymmetric with respect to the optical axis 20ax. Furthermore, r represents the distance from the origin in a direction orthogonal to the optical axis, and Z represents the distance from the origin along the optical axis. Furthermore, c represents the paraxial curvature radius.

K is a value referred to as a conic constant. The shape of the rotated surface of the second order is limited to a specific shape by the conic constant K. That is, when the conic constant K is more than −1 and less than 0, the aspherical surface is an ellipsoid of revolution. When the conic constant K is equal to 1, the aspherical surface is a paraboloid of revolution. When the conic constant K is less than −1, the aspherical surface is a hyperboloid of revolution.

The paraxial curvature radius c is found in consideration of the shape of the reflecting surface 30R of the elliptic reflector 30, the refractive index n of the aspherical lens 40, the thickness of the center of the aspherical lens 40, and the position of the aspherical lens 40. More specifically, the shape of the reflecting surface 30R of the elliptic reflector 30, the refractive index m of the aspherical lens 40, the thickness of the center of the aspherical lens 40, and the position of the aspherical lens 40 are determined beforehand. Then, a concave aspherical lens having the same refractive index and the same center thickness is placed at the determined position relative to an elliptic reflector having the same shape as the determined shape of the reflecting surface 30R, and the curvature of the concave aspherical lens that allows the light to be converted into parallel light in the paraxial region (region close to the revolution axis). This curvature serves as the paraxial curvature radius c. Therefore, when the shape of the aspherical surface that allows ideal parallel light is determined, the combination of the elliptic reflector 30 and the aspherical lens 40, that is, the shape of the reflecting surface 30R of the elliptic reflector 30, the position of the aspherical lens 40, and the paraxial curvature radius c are determined.

In a case in which the incident surface is aspherical as in the first exemplary embodiment, when the refractive index of the aspherical lens 40 is designated n, an aspherical surface that satisfies the condition expressed by the above Equation 1 in which the conic constant K is set at $-n^2$ is used, thereby obtaining parallel light.

Figure 11:
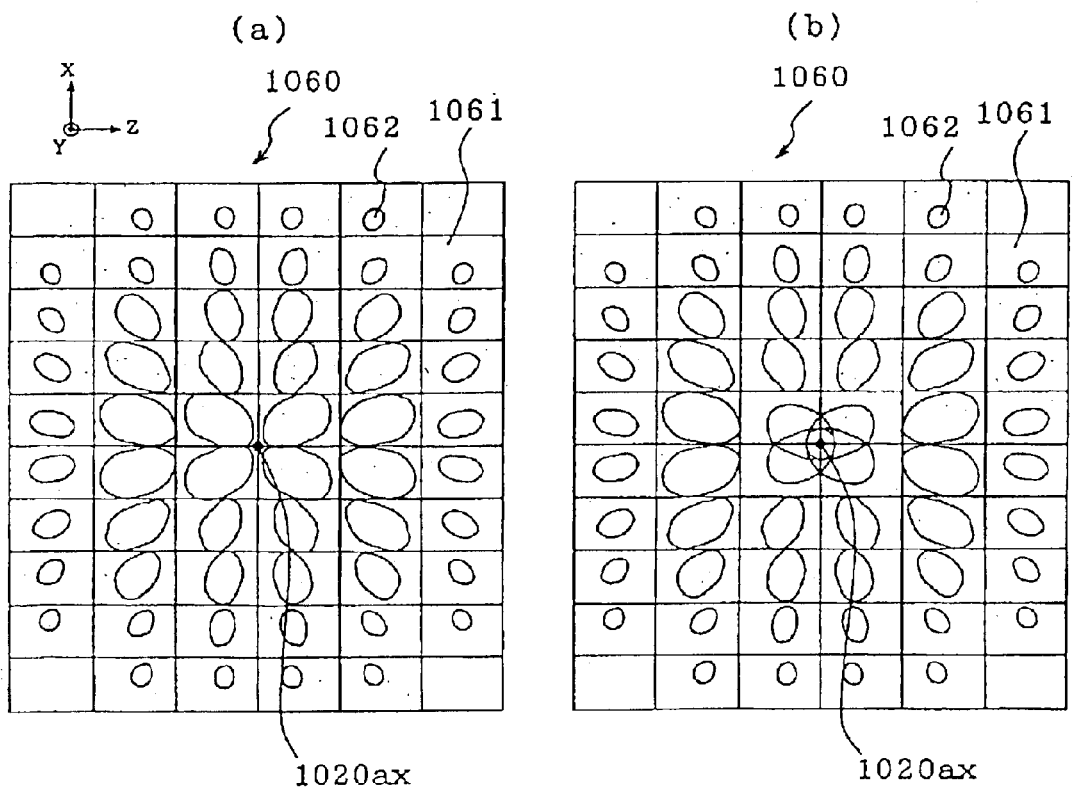
FIGS. 11(a) and 11(b) are schematics showing arc images formed on a second lens array.

The optical power of, in particular, the center of the aspherical surface (the center portion around the light-source optical axis 20ax) can be increased by increasing the conic constant K. That is, the optical path of the light beam parallel to the light-source optical axis 20ax can be changed to an optical path gradually directed outward by increasing the conic constant K. Therefore, by gradually increasing the conic constant K, arc images that are offset toward the light-source optical axis 20ax on the second lens array 60 (arc images in four cell lenses around the light-source optical axis, as shown in FIGS. 11(a) and 11(b)) can be gradually separated in the radial direction. Accordingly, in the first exemplary embodiment, a conic constant K that allows the emission of ideal parallel light is set as the initial value, the simulation is repeated while gradually increasing the conic constant K, and the conic constant K when the arc images offset toward the light-source optical axis 20ax are contained within the cell lenses 61 in which the arc images should be contained is determined as the conic constant Kp best suited to determine the aspherical surface 40A of the first embodiment.

The shape of the aspherical surface 40A of the first exemplary embodiment is set so as to satisfy the condition expressed by the above Equation 1 on the basis of the conic constant Kp determined in this way. Other structures (for example, the shape of the reflecting surface 30R of the elliptic reflector 30, and the position of the aspherical lens 40) are the same or substantially the same as those when ideal parallel light can be emitted from the aspherical lens. By using the aspherical surface 40A set in this way, of the light beams reflected from the elliptic reflector 30, light beams 80 and 81 that pass through the center portion around the light-source optical axis 20ax and are emitted as substantially parallel light can be caused to travel slightly outward like light beams 80a and 81a, as shown in FIG. 1. Therefore, the arc images can be contained within the cell lenses 61. This makes it possible to reduce light loss, to effectively utilize the light from the light source, and to efficiently illuminate the illumination area LA.

While not only the light beams in the center portion around the light-source optical axis 20ax, but also the light beams in the peripheral portion are similarly changed to travel outward in the method of the first embodiment, since arc images in the peripheral portion are smaller than in the center portion, as shown in FIGS. 11(a) and 11(b) described above, they rarely extend outside the cell lenses 61, and a significant problem does not arise. Even if the arc images extend outside, the problem can be overcome by changing the shape of the corresponding cell lenses of the second lens array 60 so that the arc images can be contained therein. That is, although the cell lenses of the first lens array 50 must be similar to the illumination area, this condition does not apply to the second lens array 60, and the shape of the cell lenses may be freely changed. Consequently, the first embodiment allows the arc images to be reliably contained within the cell lenses 61 of the second lens array 60.

Second Exemplary Embodiment

Figure 3:
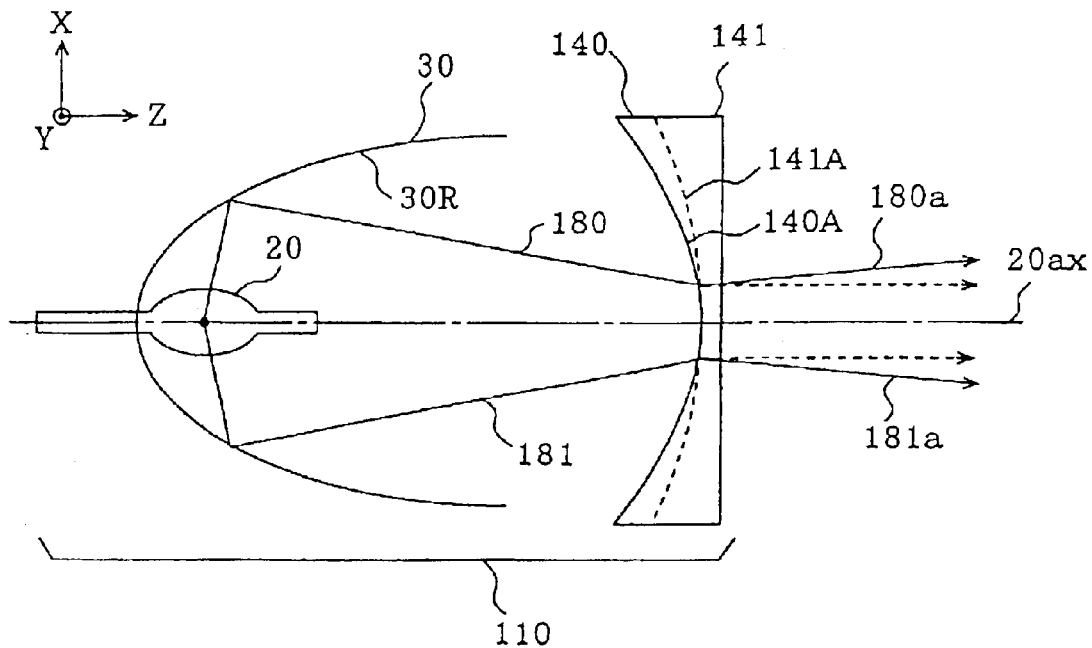
FIG. 3 is a schematic of an illumination optical system according to a second exemplary embodiment of the present invention.

FIG. 3 is a schematic of an illumination optical system according to a second exemplary embodiment of the present invention. In FIG. 3, a light source device 110 in the illumination optical system of the second exemplary embodiment is shown, and a first lens array 50 and a second lens array 60 are not shown. In FIG. 3, the same components as those in FIG. 2 are denoted by the same reference numerals, and descriptions thereof are omitted.

In the second exemplary embodiment, in an elliptic reflector 30 and an aspherical lens 141 combined to emit ideal parallel light, the aspherical lens 141 is replaced with an aspherical lens 140 with an aspherical surface 140A that has a paraxial curvature radius smaller than that of an aspherical surface 141A thereof. Other structures are similar to those in the first exemplary embodiment.

Since the total optical power of the aspherical lens 141 can be increased by decreasing the paraxial curvature radius c, that is, since the optical power of the center portion of the aspherical lens 141 can also be increased, of the light beams reflected by the elliptic reflector 30, light beams 180 and 181 that pass through the center portion around a light-source optical axis 20ax and are emitted as substantially parallel light can be caused to travel slightly outward, like light beams 180a and 181a. Therefore, arc images offset toward the light-source optical axis 20ax on the second lens array 60 (arc images in four cell lenses around the light-source optical axis, as shown in FIGS. 11(a) and 11(b)) can be gradually separated in the radial direction.

Accordingly, in the second exemplary embodiment, the paraxial curvature radius c of the aspherical surface 141A that allows the emission of ideal parallel light is set as the initial value, the simulation is repeated while gradually decreasing the paraxial curvature radius c, and the paraxial curvature radius c when the arc images offset toward the light-source optical axis 20ax are contained within the cell lenses 61, in which the arc images should be contained, is determined as the paraxial curvature radius cp best suited to determine the aspherical surface 140A.

By using the aspherical surface 140A having the paraxial curvature radius cp determined as described above, the light beams can pass through the corresponding cell lenses 51 and 61 of the first lens array 50 and the second lens array 60, that is, the arc images formed on the second lens array 60 can be contained within the cell lenses 61 in which they should be contained. This makes it possible to reduce light loss and to efficiently illuminate the illumination area.

Since the total optical power of the aspherical surface is increased in the second embodiment, in a manner similar to that in the first exemplary embodiment (in the first exemplary embodiment, the optical power of, in particular, the center portion of the aspherical surface can be increased), not only the light beams in the center portion around the light-source optical axis 20ax, but also the light beams in the peripheral portion are changed to travel outward, and this has no significant effect, as described above. Consequently, the second exemplary embodiment allows all arc images formed on the second lens array 60 to be reliably contained within the corresponding cell lenses 61.

Third Exemplary Embodiment

Figure 4:
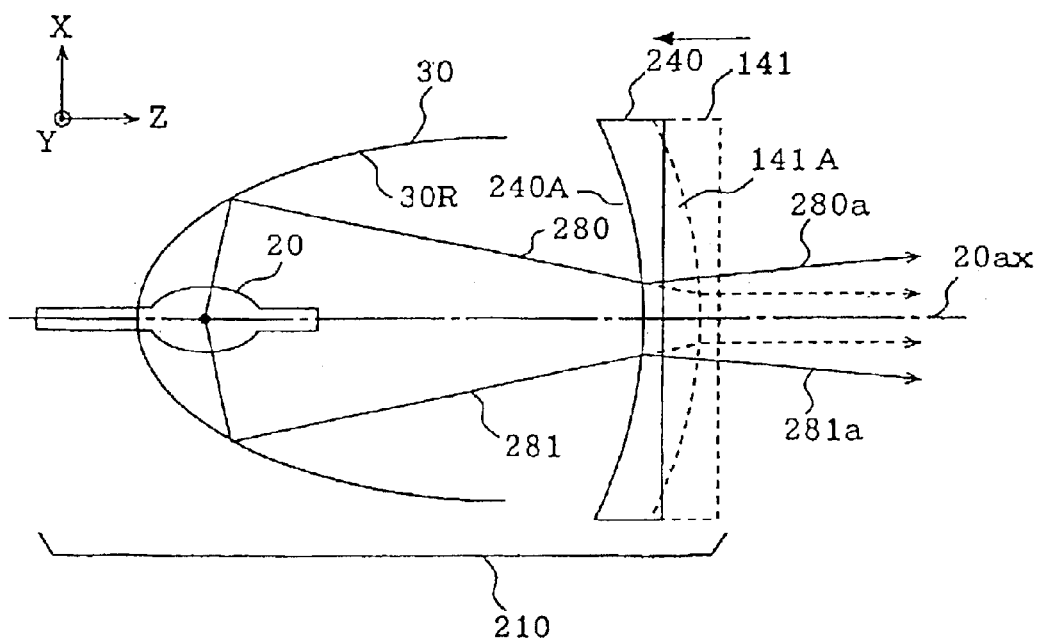
FIG. 4 is a schematic of an illumination optical system according to a third exemplary embodiment of the present invention.

FIG. 4 is a schematic of an illumination optical system according to a third exemplary embodiment of the present invention, and in FIG. 4, a light source device 210 in the illumination optical system of the third exemplary embodiment is shown, and a first lens array 50 and a second lens array 60 are not shown. In FIG. 4, the same components as those in FIG. 2 are denoted by the same reference numerals, and descriptions thereof are omitted.

In the third exemplary embodiment, in an elliptic reflector 30 and an aspherical lens 141 combined so as to emit ideal parallel light, the position of the aspherical lens 141 is shifted toward the elliptic reflector 30. In FIG. 4, the aspherical lens 141 whose position has been shifted is shown as an aspherical lens 240. In such a light-collecting optical system (the optical system shown in FIG. 4 is an optical system that collects light toward the second focal point), the optical power increases away from a light-source optical axis 20ax in the radial direction. Therefore since the position is shifted toward the elliptic reflector 30 so that light beams enter a portion of an aspherical surface 240A further from the center than before shifting, the light beams entering the aspherical surface 240A after shifting receive a higher optical power than that of an aspherical surface 141A before shifting. That is, the light beams are subjected to an action similar to that in the above second embodiment. Consequently, as shown in FIG. 4, of the light beams reflected by the elliptic reflector 30, light beams 280 and 281 that pass the center portion around the light-source optical axis 20ax and are emitted as substantially parallel light can be caused to travel slightly outward like light beams 280a and 281a, in a manner similar to that in the above second exemplary embodiment. Other structures are similar to those in the first exemplary embodiment.

Therefore, arc images offset toward the light-source optical axis 20ax on the second lens array 60 (in particular, arc images within four cells around the light-source optical axis of the arc images shown in FIGS. 11(a) and 11(b)) can be gradually separated in the radial direction by gradually shifting the aspherical lens 240 from the position which allows the emission of ideal parallel light, toward the elliptic reflector 30. The degree of shifting toward the elliptic reflector 30 is determined by simulation, in a manner similar to the above, and the position that allows the arc images offset toward the light-source optical axis 20ax on the second lens array 60 to be contained in the cell lenses in which they should be contained is determined as the optimal position.

By using the aspherical lens 240 placed at the position determined as described, light beams can pass through the corresponding cell lenses 51 and 61 of the first lens array 50 and the second lens array 60, that is, arc images formed on the second lens array 60 are contained within the cell lenses in which they should be contained. Consequently, it is possible to reduce light loss and to efficiently illuminate the illumination area.

In the method of the third exemplary embodiment, not only the light beams in the center portion around the light-source optical axis 20ax, but also the light beams in the peripheral portion receive a higher optical power, and are changed to travel outward, in a manner similar to that in the above second exemplary embodiment. However, this does not have a significant effect, as described above. Accordingly, the third exemplary embodiment allows all arc images formed on the second lens array 60 to be reliably contained within the corresponding cell lenses 61.

Fourth Exemplary Embodiment

Figure 5:
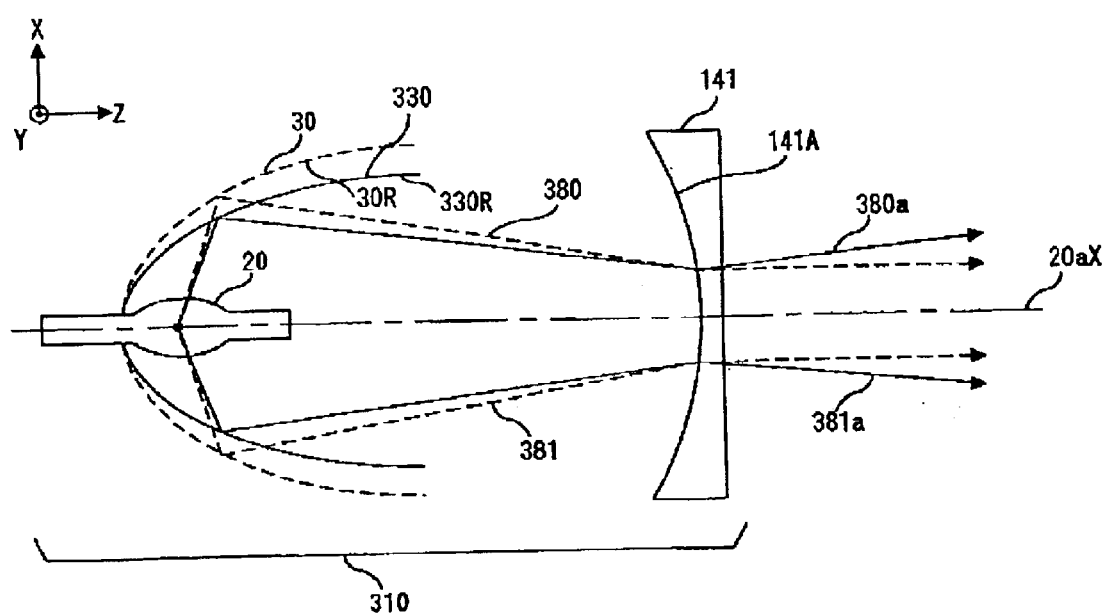
FIG. 5 is a schematic of an illumination optical system according to a fourth exemplary embodiment of the present invention.

FIG. 5 is a schematic of an illumination optical system according to a fourth exemplary embodiment of the present invention, and in FIG. 5, a light source device 310 in the illumination optical system of the fourth exemplary embodiment is shown, and a first lens array 50 and a second lens array 60 are not shown. In FIG. 5, the same components as those in FIG. 2 are denoted by the same reference numerals, and descriptions thereof are omitted.

In the fourth exemplary embodiment, in an elliptic reflector 30 and an aspherical lens 141 combined so as to emit ideal parallel light, the elliptic reflector 30 is replaced with an elliptic reflector 330 whose focal distance is longer than the distance between the first focal point and the second focal point of the elliptic reflector 30. Other structures are similar to those in the first exemplary embodiment.

By using the elliptic reflector 330 in which the distance between the first focal point and the second focal point is long, the light beams reflected by the replaced elliptic reflector 330 enter a portion of the aspherical lens 141 at a smaller angle with the light-source optical axis 20ax than the light beams reflected by the elliptic reflector 30 not replaced (that is, the reflector that satisfies the condition to obtain parallel light), and are subjected to an action similar to that in the above second and third exemplary embodiments, that is, receive a higher optical power. Therefore, as shown in FIG. 5, of the light beams reflected by the elliptic reflector 30, light beams 380 and 381 that pass through the center portion around a light-source optical axis 20ax and are emitted as substantially parallel light can be caused to travel slightly outward like light beams 380a and 381a, in a manner similar to that in the above second and third embodiments.

Therefore, by changing the elliptic reflector 30 to an elliptic reflectors having a longer distances between the first focal point and the second local point, arc images offset toward the light-source optical axis 20ax on the second lens array 60 (in particular, arc images in four cells around the light-source optical axis of the arc images shown in FIGS. 11(a) and 11(b)) can be gradually separated in the radial direction. The preferable distance between the first focal point and the second focal point in the elliptic reflector is determined by simulation in a manner similar to the above. That is, the simulation is repeated while gradually changing the elliptic reflector 30 to an elliptic reflector having a longer distance between the first focal point and the second focal point, and the elliptic reflector 330 that allows the arc images offset toward the light-source optical axis 20ax on the second lens array to be contained in the cell lenses 61 in which they should be contained is determined as the optimal elliptic reflector.

By using the elliptic reflector 330 determined as described above, light beams can pass through the corresponding cell lenses 51 and 61 of the first lens array 50 and the second lens array 60, that is, arc images formed on the second lens array 60 can be contained in the cell lenses 61 in which they should be contained. Consequently, it is possible to reduce light loss and to efficiently illuminate the illumination area.

In the method of the fourth exemplary embodiment, not only the light beams in the center portion around the light-source optical axis 20*ax*, but also the light beams in the peripheral portion, receive a higher optical power, and they are changed to travel outward, in a manner similar to that in the above second and third exemplary embodiments. However, this does not have a significant effect, as described above. Accordingly, the fourth exemplary embodiment allows all arc images formed on the second lens array 60 to be reliably contained in the corresponding cell lenses 61.

Figure 6:
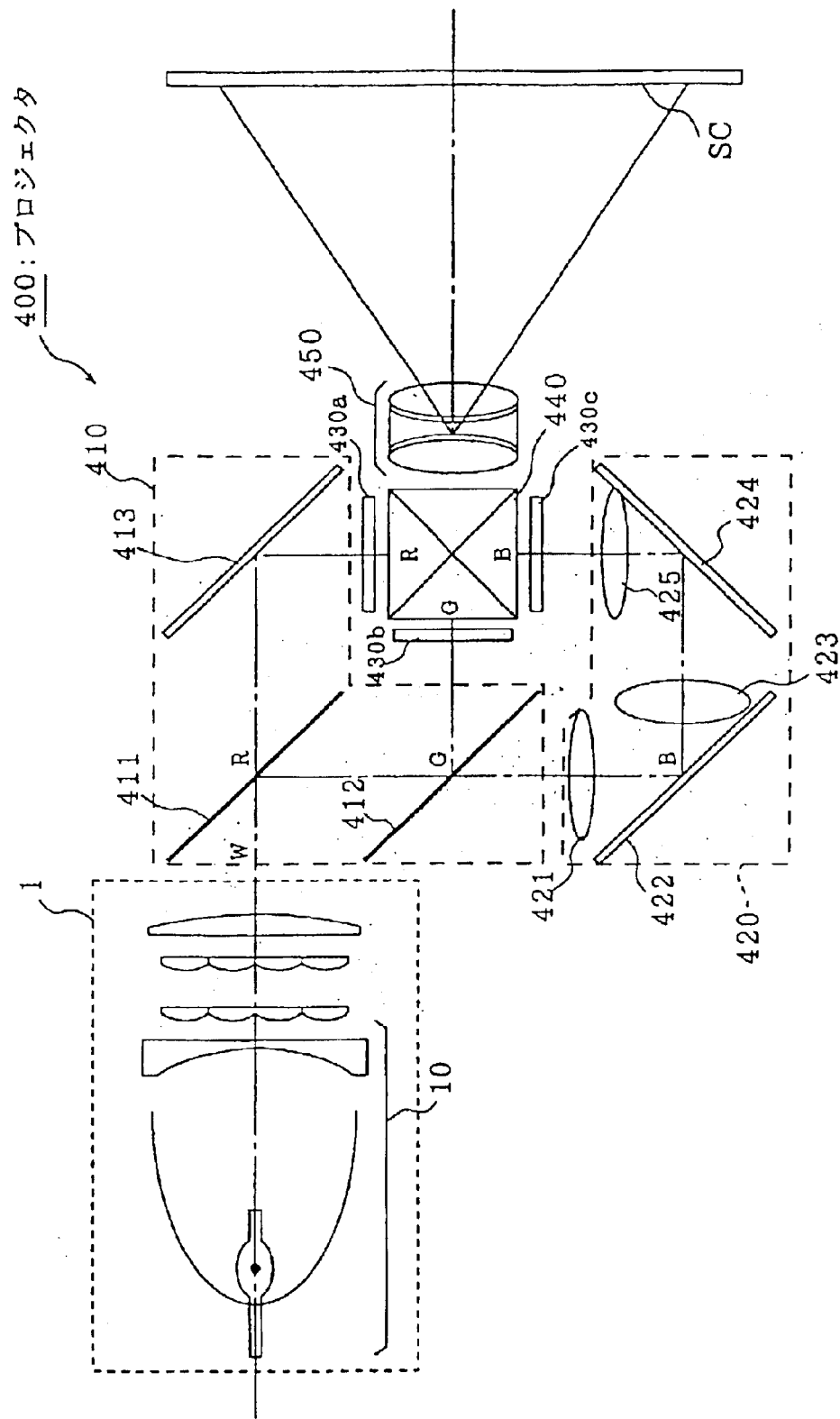
FIG. 6 is a schematic of an optical system of a projector using the illumination optical system shown in FIG. 2.

The configuration of a projector 400 incorporating the illumination optical system having the above structure is shown in FIG. 6. In this case, in particular, the projector can incorporate the illumination optical system 1 shown in FIG. 2 that includes any of the structures shown in FIGS. 1 and 3–5.

A projector 400 shown in FIG. 6 includes an illumination optical system 1, a color separating optical system 410, a relay optical system 420, three liquid crystal panels 430*a*, 430*b*, and 430*c* (collectively denoted by reference numeral 430 when not distinguished), a crossed dichroic prism 440, and a projection lens 450.

In the projector 400 having such a configuration, emergent light emitted from a light source device 10 in the illumination optical system 1 is divided into a plurality of sub-beams by a plurality of cell lenses 51 of a first lens array 50, and the sub-beams properly pass through a plurality of corresponding cell lenses 61 of a second lens array 60, and are superimposed on the liquid crystal panels 430 by a superimposing lens 70.

The color separating optical system 410 includes a blue and green reflecting dichroic mirror 411, a green reflecting dichroic mirror 412, and a reflecting mirror 413. The blue and green reflecting dichroic mirror 411 transmits a red component of illumination light from the illumination optical system 1, and reflects a blue component and a green component. A passed red light beam R is reflected by the reflecting mirror 413, and reaches the liquid crystal panel 430*a*. On the other hand, the green beam G of the blue and green beams B and G reflected by the blue and green reflecting dichroic mirror 411 is reflected by the green reflecting dichroic mirror 412, and reaches the liquid crystal panel 430*b*. On the other hand, the blue beam B also passes through the green reflecting dichroic mirror 412, and enters the relay optical system 420.

The relay optical system 420 includes a first relay lens 421, a reflecting mirror 422, a second relay lens 423, a reflecting mirror 424, and a condenser lens 425, and causes the blue beam B to pass through these optical elements and to reach the liquid crystal panel 430*c* while maintaining the intensity thereof.

The three liquid crystal panels 430 function as an optical modulation device that modulates incident color light beams according to given image information (image signals) to form images of the color components, and correspond to so-called electrooptic devices. A polarizer (not shown) is provided on the incident side and the emergent side of each of the three liquid crystal panels 430 so that only predetermined polarized light passes through the polarizer on the incident side of the liquid crystal panel 430, and is modulated.

The modulated color beams of three colors enter the crossed dichroic prism 440 and are combined, and the combined light beams are projected onto a screen SC by the projection lens 450.

Since the projector 400 having such a configuration uses the illumination optical system 1 of the present invention, the illumination area LA is efficiently illuminated, and therefore, the brightness of an image projected on the screen SC can be increased. When the light source device 10 is replaced with the light source device 110, 210, or 310, similar advantages can be achieved.

While the incident surface of the aspherical lens 40 described in the above embodiments is a concave aspherical surface (hyperboloid of revolution) and the exit surface thereof is flat, the above exemplary embodiments are similarly applicable to, for example, a meniscus lens (lens in which the first surface and the second surface have the curvatures of the same sign) in which the incident surface is flat and the exit surface is concave and aspherical (ellipsoid of revolution) or in which the incident surface is spherical and the exit surface is aspherical (ellipsoid of revolution).

While the illumination optical system of the present invention is applied to the transmissive projector 400 in the above embodiments, the present invention is also applicable to a reflective projector. Herein, "transmissive" type refers to the type in which electro devices, such as liquid crystal panels, transmit light, and "reflective" type refers to the type in which electrooptic devices, such as liquid crystal panels, reflect light. In some projectors that adopt reflective electrooptic devices, a dichroic prism is used as a color separating device to separate light into three colors, red, green, and blue, and is also used as a color combining device to combine three modulated color light beams and to emit the combined light beams in the same direction. In a case in which the present invention is applied to a reflective projector, advantages substantially similar to those in the transmissive projector can be provided.

While the projector in this embodiment displays a color image, the light source device of the present invention may be applied to a projector that displays a monochrome image. In this case, advantages similar to those of the above projector can be provided.

While the liquid crystal panels are used as the electrooptic devices for optical modulation in this embodiment, it is not limited to those, for example, micromirrors may be used.

While a front projection projector that performs projection from the viewing direction of a projected image has been described in this exemplary embodiment, the light source device of the present invention may be applied to a rear projection projector that performs projection from a direction opposite to the viewing direction of a projected image.

While the illumination optical system of the present invention is applied to a so-called three-panel projector using three liquid crystal panels in this exemplary embodiment, it is also applicable to a two- or four-panel projector that uses two or four liquid crystal panels.

What is claimed is:

1. An illumination optical system, comprising:

a light source;

an elliptic reflector to reflect light from said light source;

an aspherical lens having a concave aspherical surface; and first and second lens arrays each including a plurality of cell lenses to divide light from said aspherical lens into a plurality of sub beams, said light source, said elliptic reflector, said aspherical lens, and said first and second lens arrays being arranged along a light-source optical axis in this order, said aspherical lens changes optical paths of light beams passing through a center portion around said light-source optical axis, of a reflected light reflected by said elliptic reflector, to optical paths directed slightly outward rather than optical paths parallel to said light-source optical axis, and changes optical paths of other light beams, of said reflected light reflected by said elliptic reflector, to optical paths substantially parallel to said light-source optical axis, so that said light beams pass through said corresponding cell lenses of said first and second lens arrays.

2. The illumination optical system according to claim 1, a conic constant that specifies a shape of said aspherical surface of said aspherical lens being set to be larger than a conic constant that specifies the shape of said aspherical surface of said aspherical lens that allows ideal parallel light to be emitted from said aspherical lens.

3. The illumination optical system according to claim 1, a paraxial curvature radius of said aspherical surface of said aspherical lens being set to be smaller than the paraxial curvature radius of said aspherical lens that allows ideal parallel light to be emitted from said aspherical lens.

4. The illumination optical system according to claim 1, said aspherical lens being shifted toward said elliptic reflector from a position at which the aspherical lens can emit ideal parallel light.

5. The illumination optical system according to claim 1, an elliptic reflector and an aspherical lens being combined on a condition that allows ideal parallel light to be emitted from said aspherical surface, and a distance between a first focal point and a second focal point in said elliptic reflector being longer than a distance in the elliptic reflector that satisfies the condition.

6. The illumination optical system according to claim 1, of the reflected light reflected by said elliptic reflector, the light beams in said center portion around said light-source optical axis having the optical paths passing through four cell lenses around said light-source optical axis of each of said first lens array and said second lens array.

7. A projector, comprising:
the illumination optical system according to claim 1.

8. The projector according to claim 7, a conic constant that specifies a shape of said aspherical surface of said aspherical lens being set to be larger than a conic constant that specifies the shape of said aspherical surface of said aspherical lens that allows ideal parallel light to be emitted from said aspherical lens.

9. The projector according to claim 7, a paraxial curvature radius of said aspherical surface of said aspherical lens being set to be smaller than the paraxial curvature radius of said aspherical lens that allows ideal parallel light to be emitted from said aspherical lens.

10. The projector according to claim 7, said aspherical lens being shifted toward said elliptic reflector from a position at which the aspherical lens can emit ideal parallel light.

11. The projector according to claim 7, an elliptic reflector and an aspherical lens being combined on a condition that allows ideal parallel light to be emitted from said aspherical surface, and a distance between a first focal point and a second focal point in said elliptic reflector being longer than a distance in the elliptic reflector that satisfies the condition.

12. The projector according to claim 7, of the reflected light reflected by said elliptic reflector, the light beams in said center portion around said light-source optical axis having the optical paths passing through four cell lenses around said light-source optical axis of each of said first lens array and said second lens array.

* * * * *